(12) United States Patent
Girgensohn et al.

(10) Patent No.: US 6,807,362 B1
(45) Date of Patent: Oct. 19, 2004

(54) SYSTEM AND METHOD FOR DETERMINING VIDEO CLIP BOUNDARIES FOR INTERACTIVE CUSTOM VIDEO CREATION SYSTEM

(75) Inventors: Andreas Girgensohn, Menlo Park, CA (US); John S. Boreczky, San Leandro, CA (US); John J. Doherty, San Francisco, CA (US); Patrick Chiu, Menlo Park, CA (US); Lynn D. Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1015 days.

(21) Appl. No.: 09/618,649

(22) Filed: Jul. 18, 2000

(51) Int. Cl.⁷ ................................................. H04N 5/93

(52) U.S. Cl. ........................ 386/52; 386/46; 386/83; 360/15

(58) Field of Search ........................ 386/46, 52, 55, 386/64, 83; 360/13; 369/83; 348/700–702; 345/723; 725/51, 52, 53

(56) References Cited

U.S. PATENT DOCUMENTS

| | | | | |
|---|---|---|---|---|
| 5,521,841 A | * | 5/1996 | Arman et al. ................ | 345/723 |
| 6,327,418 B1 | * | 12/2001 | Barton ......................... | 386/46 |
| 6,553,178 B2 | * | 4/2003 | Abecassis .................... | 386/46 |
| 6,567,980 B1 | * | 5/2003 | Jain et al. ..................... | 725/51 |
| 6,631,522 B1 | * | 10/2003 | Erdelyi ........................ | 345/723 |
| 2003/0189588 A1 | | 10/2003 | Girgensohn | |
| 2003/0190143 A1 | | 10/2003 | Girgensohn | |

OTHER PUBLICATIONS

Lienhart, R., "Dynamic Video Summarization of Home Video," *SPIE 3972: Storage and Retrieval for Media Databases 2000*, pp. 378–389, 2000.

Smith, J.M., Stotts, D. and Kum, S.–U., "An Orthogonal Taxanomy For Hyperlink Anchor Generation in Video Streams Using OvalTine," *Proc. Of ACM Hypertext 2000*, pp. 11–18, 2000.

Uchihashi, S., Foote, J., Girgensohn, A. and Boreczky, J., "Video Manga: Generating Semantically Meaningful Video Summaries," *Proceedings of ACM Multimedia '99*, pp. 383–392.

Boissière, G., "Automatic creation of hypervideo news libraries for the World Wide Web," *Hypertext '98 Proceedings, ACM*, Pittsburgh, PA, 1998.

Yeung, M.M., and Yeo, B.–L., "Video Visualization for Compact Presentation and Fast Browsing of Pictorial Content," *IEEE Transactions on Circuits and Systems for Video Technology*, vol. 7, No. 5, Oct. 1997.

Zhang, H.J., et al., "Automatic Parsing and Indexing of News Video," *Multimedia Systems*, 2 (6), pp. 256–266, 1995.

(List continued on next page.)

*Primary Examiner*—Thai Tran
*Assistant Examiner*—Christopher Onuaku
(74) *Attorney, Agent, or Firm*—Fliesler Meyer LLP

(57) ABSTRACT

A heuristically derived unsuitability score is computed and used as an input for metaphorical springs in which each selected video segment from recorded video of a video camera is associated with a metaphorical spring that maintains the selected segment at an optimal length while being responsive to a global system spring whose spring strength determines a final length of a final edited output video. Accordingly, user-specified changes to the final length of the final output video automatically lengthen or shorten the lengths of individual segments in such a way that high quality video segments having low unsuitability scores are emphasized over low quality video segments having high unsuitability scores.

40 Claims, 2 Drawing Sheets

OTHER PUBLICATIONS

Avrahami, G., Brooks, K.P., and Brown, M.H. "A Two-View Approach to Constructing User Interfaces," ACM SIGGRAPH '89.

Boreczky, J. and Wilcox L. "A Hidden Markov Model Framework for Video Segmentation Using Audio and Image Features," in *Proc ICASSP '98*, IEEE, May 1998, Seattle.

Boreczky, J. and Rowe, L. "Comparison of Video Shot Boundary Detection Techniques," Proc. SPIE Storage and Retrieval for Image and Video Databases IV, San Jose, CA, 1996.

Christal, M., Smith, M., Taylor, C. and Winkler, D., "Evolving Video Skims into Useful Multimedia Abstractions," in Human Factors in Computing Systems, CHI 98 Conference Proceedings (Los Angeles, CA), New York: ACM, pp. 171–178, 1998.

Girgensohn, A. and Boreczky, J. "Time–Constrained Keyframe Selection Technique," in IEEE Multimedia Systems '99, IEEE Computer Society, vol. 1, pp. 756–761, 1999.

He, L., Sanocki, E., Gupta, A., Grudin, J. "Auto–Summarization of Audio–Video Presentation," ACM Multimedia, Nov. 1999.

Knuth, D., *The $T_E$ Xbook*, Addison Wesley, 1984.

Pfeiffer, S., Lienhart, R., Fischer, S. and Effelsberg, W., "Abstracting Digital Movies Automatically," in Journal of Visual Communication and Image Representation 7(4), pp. 345–353, Dec. 1996.

Russell, D. "A Design Pattern–Based Video Summarization Technique: Moving from Low–Level Signals to High–Level Structures" HICCS 2000.

Smith, M. and Kanade, T., "Video Skimming and Characterization through the Combination of Image and Language Understanding Techniques," in Proc. Computer Vision and Pattern Recognition, pp. 775–781, 1997.

Uchihashi, S. and Foote, J., "Summarizing Video Using a Shot Importance Measure and a Frame–Packing Algorithm," in Proc. ICASSP '99, vol. 6, pp. 3041–3044, 1999.

Webster, B.F. *The NeXT Book*, Addison–Wesley, 1989.

\* cited by examiner

SYSTEM AND METHOD FOR DETERMINING VIDEO CLIP BOUNDARIES FOR INTERACTIVE CUSTOM VIDEO CREATION SYSTEM

BACKGROUND OF THE INVENTION

Video cameras are becoming increasing popular for both home and office use. Video is commonly used to document family events such as vacations, weddings, and graduations. In the office, video cameras are used to record presentations and user studies, and are often taken on business trips to record people, places, and meetings. Further, the use of Digital Video (DV), a digital camcorder format, is burgeoning due to the combination of high-quality digital video, inexpensive video capture cards and hard disk drives, and public interest in creating video content for the World Wide Web.

However, the problem is that it is difficult to make use of this video after it has been recorded. While people may view the video they recorded once or twice, it is typically left "in the bag," since interesting portions are often intermixed with longer, less interesting portions. The video is often of poor quality stemming from, for example, abrupt camera movements or video segments that are too long to hold the viewer's interest. Further, interesting portions may be difficult to find using only fast forward and rewind, particularly when the desired portion is short relative to the rest of the video or when different portions of the video are of interest to different peoples While video editing tools exist (e.g., Adobe Premier or In-Sync's Speed Razor) these tools are quite difficult for an amateur to use. Simpler video editing tools, such as Apple's iMovie, Ulead Systems' VideoStudio, or JavuNetwork, make it easy to select video takes and arrange them in a storyboard. However, none of these systems perform video analysis in order to provide intelligent editing assistance. In particular, most of these systems provide no assistance for selecting the in and out points necessary to trim the takes and, thus, a user must manually examine the video on a frame-by-frame basis and manually trim undesirable material from the takes. This task is difficult even with the simpler editing tools.

Accordingly, there is a need for an interactive video creation system and method for analyzing and composing video that does not require manual selection of the start and end points for each video clip. There is a further need for a simple, intuitive user interface for adjusting the total length of the edited video and for modifying the length of individual video clips by the application of a set of heuristic editing rules that emphasizes high quality video clips over low quality video clips.

SUMMARY OF THE INVENTION

The present invention, roughly described, provides a system and method for editing recorded video to produce a final output video that automatically determines the video in and out points required for cutting while automatically lengthening or shortening the lengths of individual clips in response to user-specified changes to the final length of the final output video in such a way that high quality video clips having low unsuitability scores are emphasized over low quality video clips having high unsuitability scores.

The method for editing recorded video that automatically determines the video in and out points required for cutting while automatically lengthening or shortening the lengths of individual clips in response to user-specified changes to the final length of the final output video comprises the steps of (1) computing an unsuitability score for time intervals of the recorded video; (2) segmenting the recorded video into video clips having in out clip boundaries based on the suitability score; and (3) trimming the clips, wherein respective clips are associated with a metaphorical spring having a spring strength.

The heuristically derived unsuitability score is computed and used as an input for metaphorical springs in which each selected video clip of the recorded video is associated with a metaphorical spring that maintains the selected clip at an optimal length while being responsive to a global system spring whose spring strength determines the final length of the final output video.

These and other objects and advantages of the invention will appear more clearly from the following detailed description in which the preferred embodiment of the invention has been set forth in conjunction with the drawings.

DETAILED DESCRIPTION

As used herein the definitions of take, frame, clip, and keyframe are as follows. A take is a portion of recorded video between the time the camera is turned on and the time the camera is turned off (i.e., camera on and off transitions). A frame is a single still image taken from recorded video. A clip is an unbroken set of contiguous frames. Finally, a keyframe is a still frame that is well suited to represent a particular video clip selected for the final output video wherein each clip is represented by one or more frames.

Figure 1:
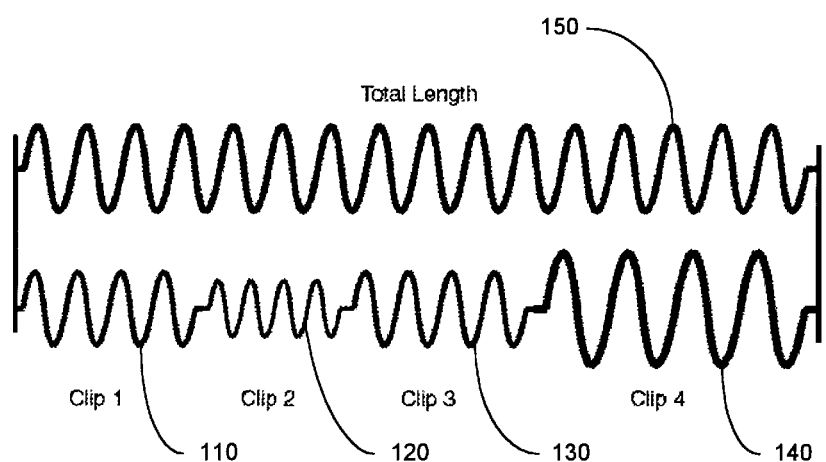
FIG. 1 illustrates an intuitive approach in modeling the relationship between the lengths of metaphorical springs of selected video clips and a length of a global spring of the final length of a final edited video.

FIG. 1 illustrates an intuitive approach in modeling the relationship between the lengths of selected video clips and the final length of the final output video. Each video clip (or video segment) is modeled by a metaphorical spring that reacts to outside forces by being compressed or stretched, thereby shortening and lengthening the clip, respectively. Accordingly, clip 1 is modeled by a first spring 110 having a first spring strength, clip 2 is modeled by a second spring 120 having a second spring strength, clip 3 is modeled by third spring 130 having a third spring strength, and clip 4 is modeled by a fourth spring 140 having a fourth spring strength.

The length of the final output video is also modeled by a metaphorical system spring 150. Users can thus adjust the final length of the final output video by adjusting the spring strength of the system spring. Individual clips can also be shortened or lengthened by modifying the spring strengths of their respective springs. For a given clip length as determined by a spring, the present invention automatically selects the in and out points for that clip. The spring metaphor also provides users with an intuitive interface for automatically lengthening or shortening the lengths of individual clips in response to user-specified changes to the final length of the final output video.

The difference, for example, between the second spring strength of second spring 120 and the fourth spring strength of fourth spring 140 is evident in the respective spring diameters and wire thicknesses. This illustrates how spring icons could be provided to serve as user interface elements for modifying the strength of individual springs via, for example, a slider. Moreover, the tension in respective springs could be visualized, for example, by varying the distance between the coils and by color (e.g., black for no tension and shades of red for increasing tension).

Figure 2:
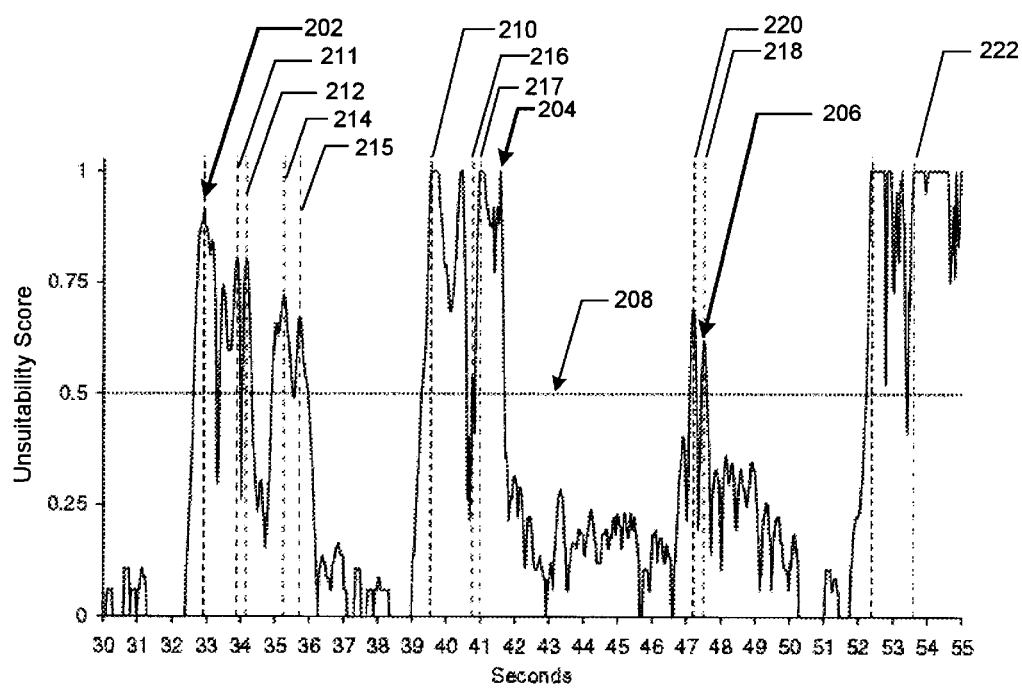
FIG. 2 illustrates a typical unsuitability score versus recording time graph.

FIG. 2 illustrates a plot of unsuitability scores for a portion of the recorded video versus the recording time. The unsuitability score is a heuristically derived score that describes the relative lack of suitability of a particular clip of recorded video for inclusion in the final output video. The unsuitability score represents a single time-dependent score for determining how suitable or unsuitable a particular video clip is for inclusion in the final output video. Desirable video clips generally have low unsuitability scores and undesirable video clips generally have high unsuitability scores.

The unsuitability score is empirically determined by analyzing the camera motion in the recorded video from frame to frame. A total displacement of the video camera for equal length time intervals of the recorded video is initially computed, where the total displacement comprises a pixel displacement along an x-axis and a pixel displacement along a y-axis. In other words, the total displacement of the video camera comprises a horizontal displacement and a vertical displacement. More specifically, the recorded video is analyzed over a sliding window of five video frames (⅙ of a second) to determine how many pixels the camera moved over these five frames in the x-direction and how many pixels the camera moved in the y-direction. The sliding window of five frames comprises the last four video frames of an immediately prior sliding window and a current video frame. While camera motion in the recorded video can be analyzed over any equal length time interval of the recorded video, analyzing the recorded video over a sliding window of five frames yields the best results in terms of what camera motion is most perceivable.

Having computed the total displacement of the video camera for equal length time intervals of the recorded video, the next step in computing the unsuitability score requires the computation of a weighted average of the horizontal and vertical pixel displacements where the vertical pixel displacement is given more weight. This takes into account the fact that vertical camera motion tends to be more visually undesirable to more people than corresponding horizontal camera motion (e.g., tilt versus pan). Accordingly, vertical camera motion represented by the vertical pixel displacement along the y-axis, is given a stronger weighting on the perceived "undesirableness" of a sequence of frames.

Subsequent curve-fitting of weighted averages computed from various sources of video to determine what amount of camera motion over what period of time was perceived to be good, acceptable, tolerable, or unacceptable indicated that a square root function was the best mathematical model for translating several camera motion parameters into a single number between 0 and 1 (after the result is properly scaled and truncated). According to this model, good video, for example, has an unsuitability score of about 0.1 to 0.3, acceptable video has an unsuitability score of about 0.4 to 0.5, tolerable video has an unsuitability score of about 0.6 to 0.7, and unacceptable video has an unsuitability score of about 0.8 to 1.0. A logarithmic function is an alternative mathematical model that could also be used to produce similar results.

Thus, a square root of the weighted average of the first and second pixel displacements is then multiplied by a scaling factor to produce a product term which is subsequently capped to produce an unsuitability score between 0 and 1. An unsuitability score could thus be computed for every half second interval, for every frame, or for every ten frames. If, for example, an unsuitability score is computed for every frame of the recorded video, the video in and out points can be specified at every single frame or if an unsuitability score is computed for every ten frames, video in and out points can only be specified at the ten frame boundaries. However, it does not matter whether an unsuitability score is computed for every frame or for every ten frames as long as an unsuitability score is computed for equal length time intervals of the recorded video. FIG. 2 illustrates a graph of sample unsuitability scores for a portion of recorded video (hereinafter referred to as the unsuitability curve). The introduction of a numerical score to represent the "suitability" or desirability of portions of the recorded video enables the use of mathematical methods for extracting video clips instead of the use of a constraint-satisfaction system for enforcing a variety of editing rules.

Having computed unsuitability scores for the recorded video, the next step is to segment the recorded video into video clips having respective in and out clip boundaries based on the unsuitability scores. The respective in and out clip boundaries represent the maximum length that any given video clip can have. The present invention automatically identifies video clips that (1) meet the minimum length requirement of three seconds; and (2) fall into the "valleys" between, for example, the peaks 202, 204, and 206 in the unsuitability curve of FIG. 2. Generally speaking, portions of the recorded video with unsuitability scores above the unsuitability score threshold are excluded from the final output video and portions with unsuitability scores below the unsuitability score threshold are included in the final output video.

The first step in determining the in and out clip boundaries is to determine an unsuitability score threshold 208 that represents the maximum amount of "undesirability" in a video clip that will be tolerable by users. The unsuitability score threshold is typically 0.5. The peaks for each part of the unsuitability curve that are completely above the unsuitability score threshold must then be identified. These peaks represent candidate clip boundaries from which the in and out clip boundaries for respective clips are subsequently selected. The vertical dashed lines in FIG. 2 indicate these candidate clip boundaries.

Note that while the in and out clip boundaries could be the video in and video out points that are used to trim the recorded video, typical video in and out points fall within the clip boundaries. Clip boundaries are also generally situated in the middle of that portion of the unsuitability curve that is above the unsuitability score threshold so as to allocate a portion of the undesirable video to the clips on either side of the clip boundaries.

If a clip between the candidate clip boundaries does not meet the minimum length requirement (i.e., three seconds), the clip is merged with its right neighbor until the minimum length requirement is satisfied. The finer dashed lines 211, 212, 214, 215, 216, 217, 218, and 222 in FIG. 2 are candidate clip boundaries that are too close to their left neighbors. These finer dashed lines are thus not used as clip boundaries.

For example, in FIG. 2, if candidate "in" clip boundary 210 at 39.5 seconds into the recorded video is selected as the in clip boundary, candidate "out" clip boundaries 216 and 217 are discarded since the clip defined by clip boundaries 210 and 216 and the clip defined by clip boundaries 210 and 217 do not meet the minimum three second clip length requirement. However, candidate "out" clip boundary 220 would be acceptable since the clip defined by clip boundaries 210 and 220 is more than three seconds long. It should be noted that the very first "in" clip boundary is the first peak unsuitability score or the first occurrence of a maximum value in the unsuitability score above the unsuitability score threshold in the unsuitability curve (as measured from the beginning of the recorded video).

This segmentation technique results in video clips having middle portions with unsuitability scores below the unsuitability score threshold and end or side portions having unsuitability scores above the unsuitability score threshold. Depending on the requested final length of the final output video and the minimum clip length requirement, a shorter or longer middle portion of the respective clips can be selected for inclusion in the final output video. In one embodiment of the present invention, the middle portion of respective clips having a minimal area under the unsuitability curve is selected for inclusion in the final output video. In another embodiment, the selected middle portions of the clips can be chosen so that they never end in a portion having an unsuitability score above a certain threshold.

Figure 3:
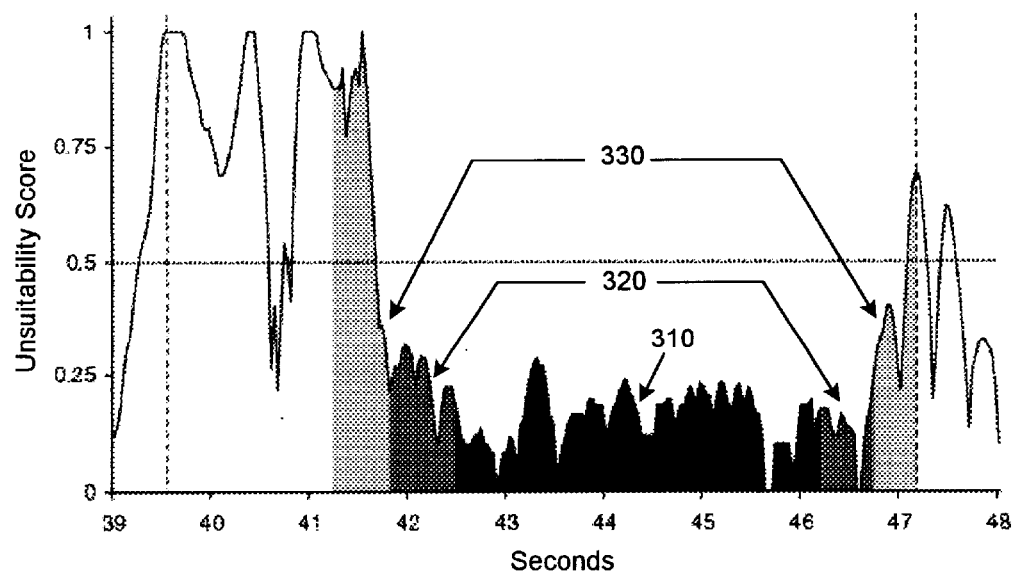
FIG. 3 illustrates the unsuitability curve for a segmented portion of the recorded video having an in clip boundary and an out clip boundary.

It is important to note, however, that selection of an increasingly longer middle portion of a given video clip may cause it to overlap with the less desirable end or side portions of the clip where the unsuitability scores may be above the unsuitability score threshold (i.e., push the selected middle portion of the clip up into the side portions of the clip or, for example, the light gray portions of FIG. 3). FIG. 3 illustrates the unsuitability curve for a segmented portion of the recorded video having an "in" clip boundary 210 and an "out" clip boundary 220. FIG. 3 also illustrates selected portions of a representative video clip. The middle portion 310 of the clip, the portion having the lowest unsuitability scores and correspondingly the highest video quality, is approximately 3.7 seconds long (see black middle portion). The portion 320 having moderate video quality is approximately 5 seconds long (medium gray portion). The portion 330 having the poorest video quality (and the highest unsuitability scores) at the ends or sides of the clip is approximately 5.9 seconds long (light gray portion).

Once the recorded video has been segmented into clips having in and out clip boundaries, the present invention employs a spring-based metaphor to represent the length of individual video clips such that any changes in the length of the final output video will appropriately change the lengths of individual clips that have been selected for inclusion in the final output video. Each clip is associated with a metaphorical spring that reacts to outside forces (e.g., user specified changes to the length of the final output video) by stretching or compressing to thereby lengthen or shorten the clip in relation to the strength of the spring. This approach simultaneously reduces the computational complexity involved in automatically determining the video in and out points while providing an intuitive interface for users to change the length of the final output video or the length of respective clips without having to manually specify the video in and out points for each clip.

The force or the spring strength of the metaphorical spring corresponding to the clip is related to the area under the unsuitability curve for the clip. Specifically, the spring strength required to stretch or to compress the metaphorical spring associated with a given clip is determined from a neutral length at which the metaphorical spring is at rest. That is, each clip is associated with a metaphorical spring having a neutral length. The length of the final output video is similarly associated with a metaphorical system spring having a neutral length. Accordingly, the user can customize the length of the final output video by compressing or stretching the system spring. However, in so doing, individual clips comprising the final output video are not necessarily compressed or stretched by the same amounts because the unsuitability score and the spring strength of respective clips can produce different spring force functions (see FIG. 1).

There are several possible approaches for selecting the neutral length of the respective metaphorical springs. In one embodiment of the present invention, the neutral length is set to either zero or the minimal length of a clip (i.e., 3 seconds). If the neutral length of the metaphorical springs is the minimal length of a clip the metaphorical springs can only be stretched and not compressed. In a second embodiment, the neutral length of the metaphorical springs can be set to the maximum length of the clip (i.e. everything between the clip boundaries). In a third embodiment, the neutral length can be the "standard" clip length of five seconds. In this case, a final output video without any constraints on the total length would consist entirely of five-second clips. This approach can be modified for clips that do not have a suitable portion of that length in which the unsuitability score stays below a threshold or the area under the curve does not exceed a certain value.

In selecting high quality clips for inclusion in the final output video, those portions of respective clips having the highest video quality (i.e., the lowest unsuitability scores) should be kept whereas portions of respective clips having poor video quality (i.e., high unsuitability scores or unsuitability scores above the unsuitability score threshold) should be excluded. The spring strength of a given spring needs to be consistent with this requirement. Thus, for an expanding spring, the inclusion of a small additional area under the unsuitability curve (low unsuitability score) in the final output video should only require a small additional force or spring strength (i.e., easy to pull out the spring).

Conversely, the inclusion of a large additional area under the unsuitability curve (high unsuitability score) in the final output video should require a large additional force or spring strength. For example, it should be easier to stretch the metaphorical spring representing the video clip of FIG. 3 to include portion 320 of the clip (medium gray shading) in the final output video than it is to include portion 330 of the clip (light gray shading). This is because portion 330 is a less desirable portion of the clip given its high unsuitability scores. Nonetheless, it is important to note that respective clips cannot be lengthened beyond the selected in and out clip boundaries regardless of how much force is applied to stretch the metaphorical spring associated with that clip.

For a contracting spring (as in the second embodiment, where the neutral length of the metaphorical springs is set to the maximum length), the opposite is true. A small area under the unsuitability curve should generate a large force or spring strength (difficult to push the spring in) whereas a large area should generate a small force or spring strength. For the contracting spring embodiment, the spring strength is proportional to the area above the unsuitability curve, whereas for the expanding spring embodiment, the force is proportional to the area below the unsuitability curve.

Figure 4:
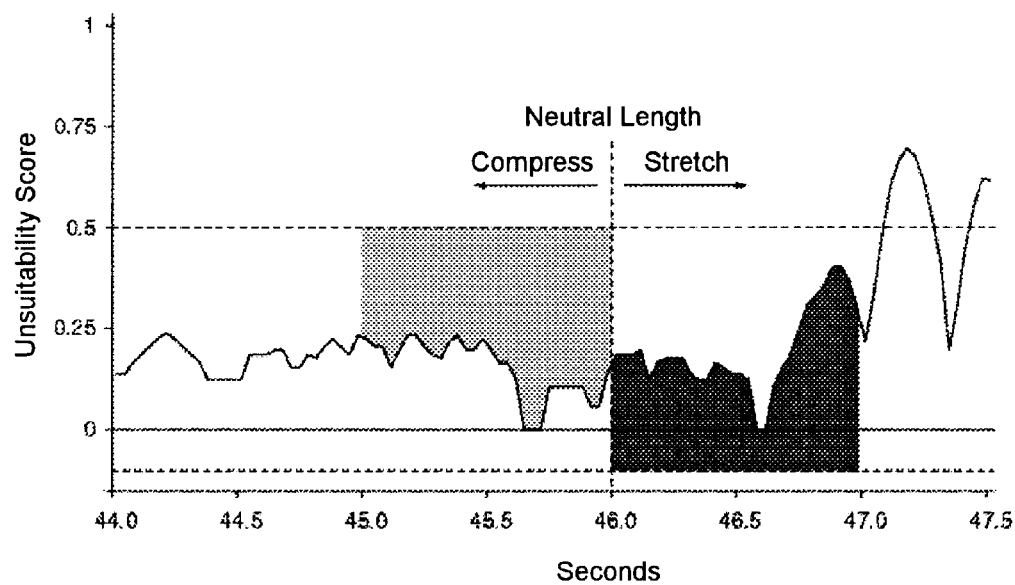
FIG. 4 illustrates the typical relationship between the spring strength, spring length and the area under and above the unsuitability score versus recording time graph.

FIG. 4 illustrates this relationship between the spring strength, spring length, and the areas above and under the unsuitability curve. That is, for the contracting spring embodiment (where the spring is compressed) the spring strength is proportional to the area above the unsuitability curve. In contrast, for the expanding spring embodiment (where the spring is stretched), the spring strength is proportional to the area below the unsuitability curve. In both cases, changing the length of the spring is intended to change its spring strength even if the area under/above the curve does not change (as can happen with an unsuitability score of zero or one). To address this concern, a linear component is added to the spring strength function (see the area below zero in FIG. 4).

For a given spring strength, the length of the spring is determined via table lookup. During the setup phase, the system loops through all possible sub-segment lengths for each clip and determines the video in and out points for the clip with the smallest area under the curve. The complexity of this algorithm is $O(n^2)$ where n is the length of the clips in units (e.g., frames). For specifying a fixed final length of the final output video (instead of modifying the spring strength of the system spring), a system embodying the present invention can iteratively decrease or increase the spring strength until the proper length is found. However, it might not be possible to satisfy such a request due to the minimum or maximum clip length requirements. In such a case, decreasing or increasing the spring strength will not change the final length of the final output video past a certain point and the system can report this outcome to the user.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, the present invention is not limited only to the video editing applications. The technique disclosed herein to create mathematical representations of other sets of editing rules, where, for example, audio features could be used to clip and summarize speech or music.

The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for editing recorded video of a video camera to produce a final output video having a final length, the method comprising:
   computing an unsuitability score for time intervals of the recorded video;
   segmenting the recorded video into clips having an in clip boundary and an out clip boundary based on the unsuitability score, respective clips being associated with a metaphorical spring having a spring strength; and
   selecting portions of respective clips having the highest video quality for inclusion in the final output video.

2. The method of claim 1, further comprising the step of splicing together portions of respective clips having the highest video quality to produce the final output video.

3. The method of claim 1, wherein the unsuitability score is computed for equal length time intervals of the recorded video.

4. The method of claim 1, wherein the unsuitability score is related to video camera motion.

5. The method of claim 4, wherein computing the unsuitability score further comprises the steps of:
   computing a total displacement of the video camera for equal length time intervals of the recorded video, the total displacement comprising a first pixel displacement along an x-axis and a second pixel displacement along a y-axis;
   computing a weighted average of the first and second pixel displacements, the second pixel displacement being given more weight;
   computing a product term for the product of a square root of the weighted average with a scaling factor; and
   truncating the product term.

6. The method of claim 5, wherein the unsuitability score is a decimal between zero and one.

7. The method of claim 1, wherein a single time interval is equivalent to a video sequence comprising at least one video frame.

8. The method of claim 1, wherein a sliding window of five video frames of the recorded video is used to compute respective unsuitability scores, the sliding window comprising the last four video frames of an immediately prior sliding window and a current video frame.

9. The method of claim 1, wherein a minimum length of a video clip defined by the in clip boundary and the out clip boundary is substantially equal to three seconds.

10. The method of claim 1, wherein the segmenting step comprises the steps of:
    graphing an unsuitability curve depicting a relationship between the unsuitability score versus recording time of the recorded video;
    assigning an unsuitability score threshold;
    selecting the in clip boundary; and
    selecting the first occurrence of the out clip boundary separated from the in clip boundary by at least three seconds, the out clip boundary also being the in clip boundary for a next clip.

11. The method of claim 10, wherein the in clip boundary is selected by choosing the first occurrence of a maximum value in the unsuitability score above the unsuitability score threshold from the unsuitability curve.

12. The method of claim 11, wherein a first in clip boundary occurs at a starting point of the recorded video.

13. The method of claim 10, wherein portions of respective clips, between selected in and out segment boundaries, having unsuitability scores below the unsuitability score threshold are more likely to be included in the final output video than portions of respective clips having unsuitability scores above the unsuitability score threshold.

14. The method of claim 10, wherein portions of respective clips, between selected in and out segment boundaries, having unsuitability scores below the unsuitability score threshold and having a minimal area below the unsuitability curve are included in the final output video.

15. The method of claim 1, wherein the metaphorical spring represents a user interface capable of being used to adjust an intermediary length of respective clips and the final length of the final output video.

16. The method of claim 1, wherein the spring strength of respective clips can be adjusted to increase or decrease a length of respective clips.

17. The method of claim 16, wherein the spring strength of respective expanding metaphorical springs is proportional to an area below an unsuitability curve depicting a relationship between the unsuitability score versus recording time of the recorded video, and the spring strength of respective contracting metaphorical springs is proportional to an above below the unsuitability curve.

18. The method of claim 17, wherein portions of respective clips having a minimal area below the unsuitability score threshold of the unsuitability curve are selected for inclusion in the final output video.

19. The method of claim 18, wherein a neutral length of respective metaphorical springs is substantially equal to a minimum length of the clips, the minimum length being determined by a plurality of editing rules.

20. The method of claim 19, wherein changing an intermediary length of respective metaphorical springs changes the corresponding spring strength even if the area below the unsuitability score threshold of the unsuitability curve does not change.

21. The method of claim 17, wherein a neutral length of respective metaphorical springs is substantially equal to a maximum length of the clips, the maximum length being determined by a plurality of editing rules.

22. The method of claim 21, wherein the maximum length is equivalent to a time interval between selected in and out video segment boundaries.

23. The method of claim 19, wherein the minimum length is substantially equal to three seconds.

24. The method of claim 19, wherein the neutral length is substantially equal to five seconds.

25. The method of claim 1, wherein the spring strength of respective clips determines to what extent a length of respective clips is increased or decreased in response to adjustments to a spring strength of a system spring, the system spring controlling the final length of the final output video.

26. The method of claim 25, wherein for a given spring strength, a length of the corresponding metaphorical spring and a length of the system spring is determined via a table lookup.

27. The method of claim 26, wherein the length of respective metaphorical springs is proportional to the length of respective clips, and the length of the system spring is proportional to the final length of the final output video.

28. A system for editing recorded video to produce a final output video having a final length, the system comprising:
   a camera motion detector;
   a processor, in communication with the camera motion detector; and
   a processor readable storage medium for storing code, the processor readable storage medium being in communication with the processor, the code capable of programming the processor to perform the steps of:
      computing an unsuitability score for time intervals of the recorded video;
      segmenting the recorded video into clips having an in clip boundary and an out clip boundary based on the unsuitability score, respective clips being associated with a metaphorical spring having a spring strength; and
      selecting portions of respective clips having the highest video quality for inclusion in the final output video.

29. The system of claim 28 further comprising a keyframe selector for selecting at least one frame representative of portions of respective clips having the highest video quality.

30. The system of claim 29 further comprising a user interface, the user interface displaying respective selected keyframes and permitting a user to change a sequence of the keyframes to any desired order.

31. The system of claim 28 further comprising a video splicer, the video splicer combining portions of respective clips to create the final output video.

32. The system of claim 28, wherein the in and out clip boundaries are automatically selected.

33. The system of claim 28, wherein the code capable of programming the processor further comprises the step of:
   splicing together portions of respective clips having the highest video quality to produce the final output video.

34. The system of claim 28, wherein the unsuitability score resulting from the computing step, of the code capable of programming the processor, is computed for equal length time intervals of the recorded video, the unsuitability score being a function of video camera motion.

35. The system of claim 28, wherein the segmenting step of the code capable of programming the processor further comprises the steps of:
   graphing an unsuitability curve depicting a relationship between the unsuitability score versus recording time of the recorded video;
   assigning an unsuitability score threshold;
   selecting an in clip boundary; and
   selecting the first occurrence of an out clip boundary separated from the in clip boundary by at least three seconds, the out clip boundary also being the in clip boundary for a next clip.

36. The system of claim 35, wherein portions of respective clips, between the in and out clip boundaries, having unsuitability scores below the unsuitability score threshold and having a minimal area below the unsuitability curve are included in the final output video.

37. The system of claim 28, wherein the metaphorical springs represent a user interface capable adjusting an intermediary length of respective clips and the final length of the final output video.

38. The system of claim 28, wherein the spring strength of respective clips can be adjusted to increase or decrease a length of respective clips.

39. The system of claim 28, wherein the spring strength of respective clips determines to what extent a length of respective clips is increased or decreased in response to adjustments to a spring strength of a system spring, the system spring controlling the final length of the final output video.

40. The system of claim 39, wherein for a given spring strength, a length of the corresponding metaphorical spring and a length of the system spring is determined via a lookup table.

* * * * *